Dec. 9, 1930.  H. S. PARDEE  1,784,310
CONTROL SYSTEM
Filed Oct. 19, 1929   7 Sheets-Sheet 3

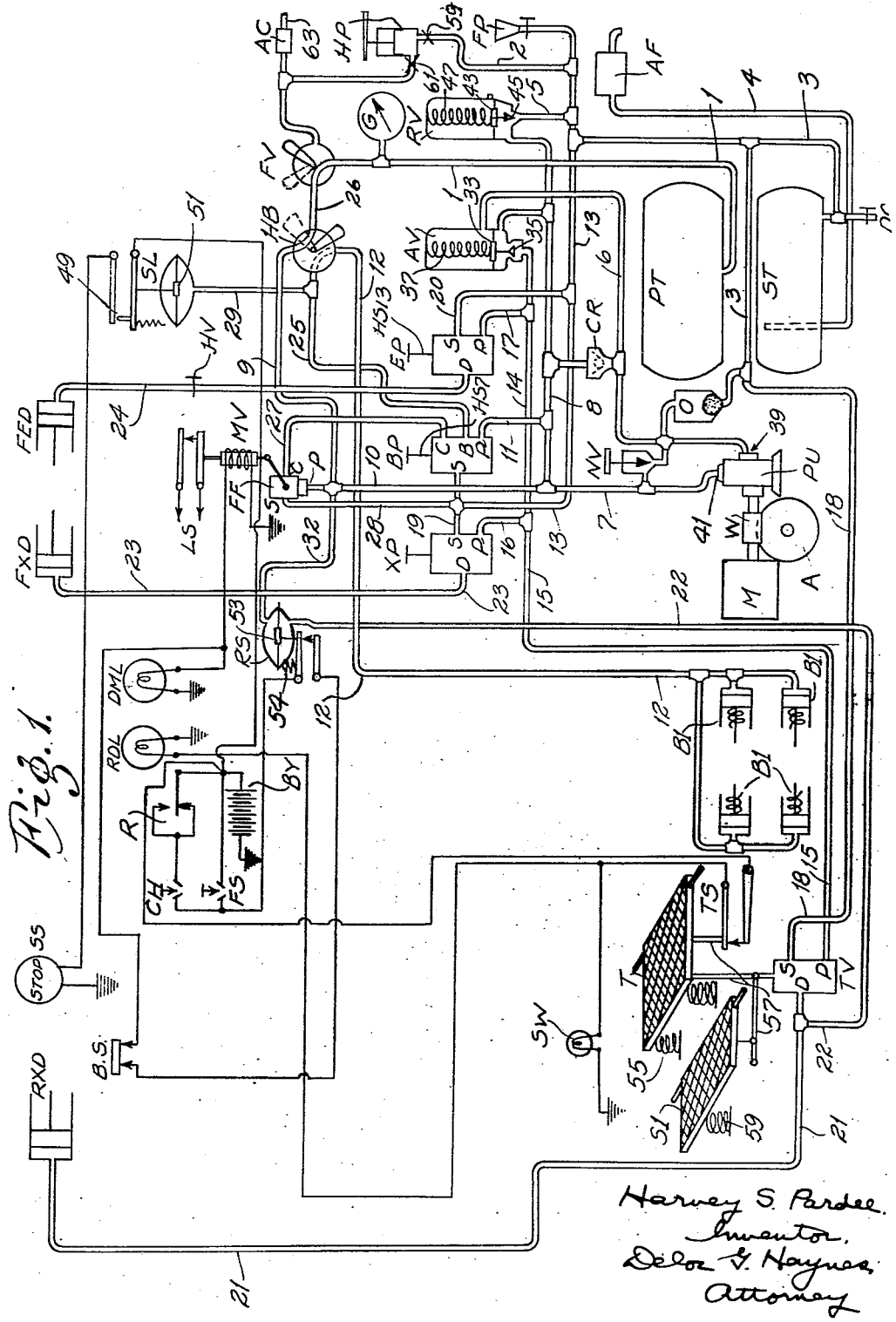

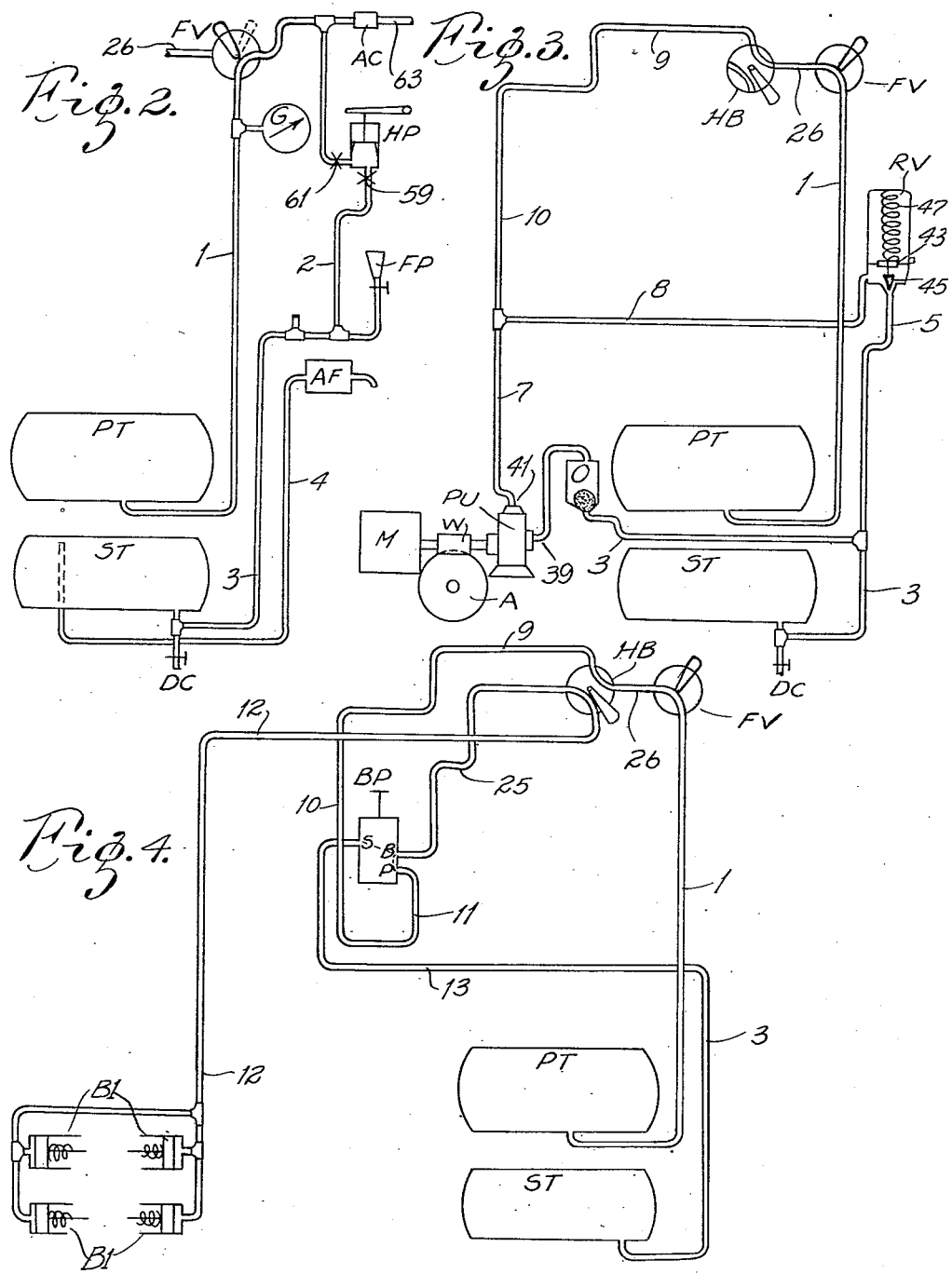

Harvey S. Pardee, Inventor.
Delos G. Haynes, Attorney

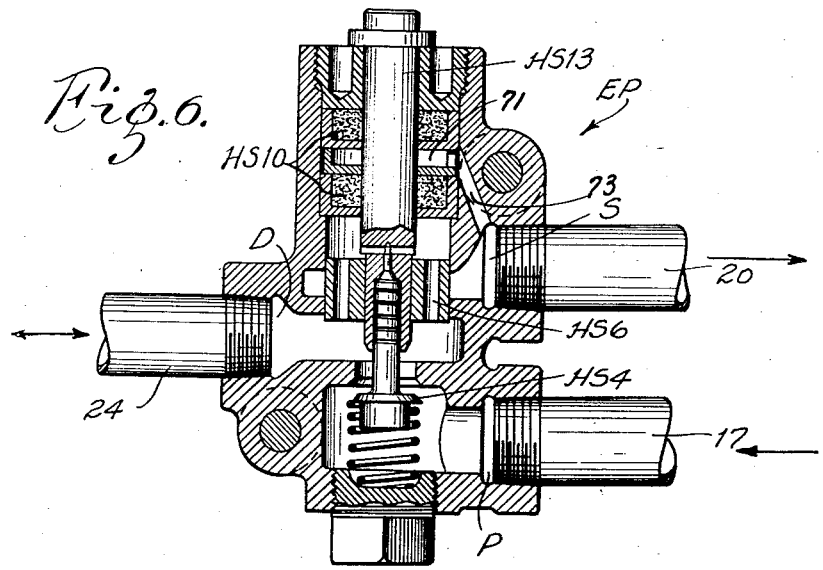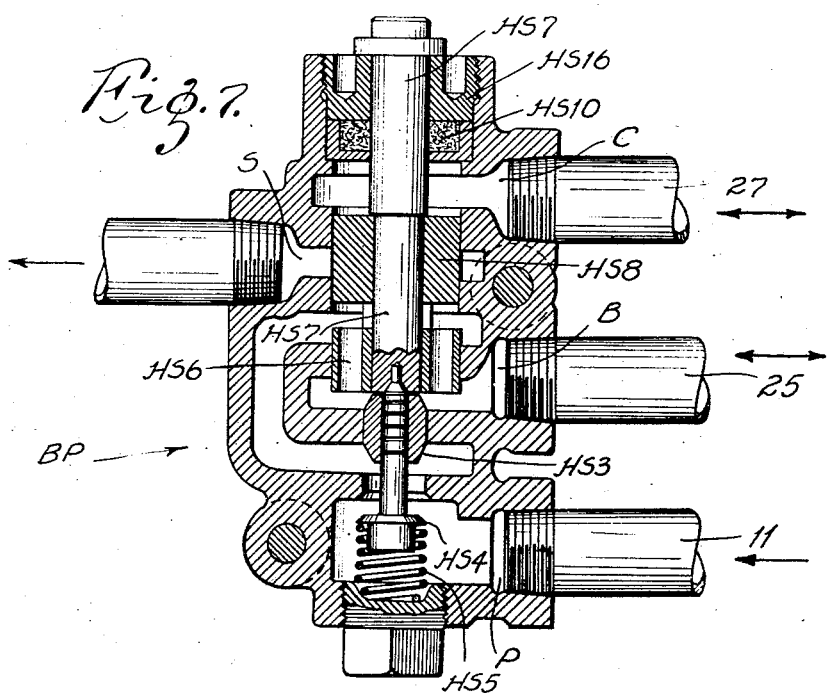

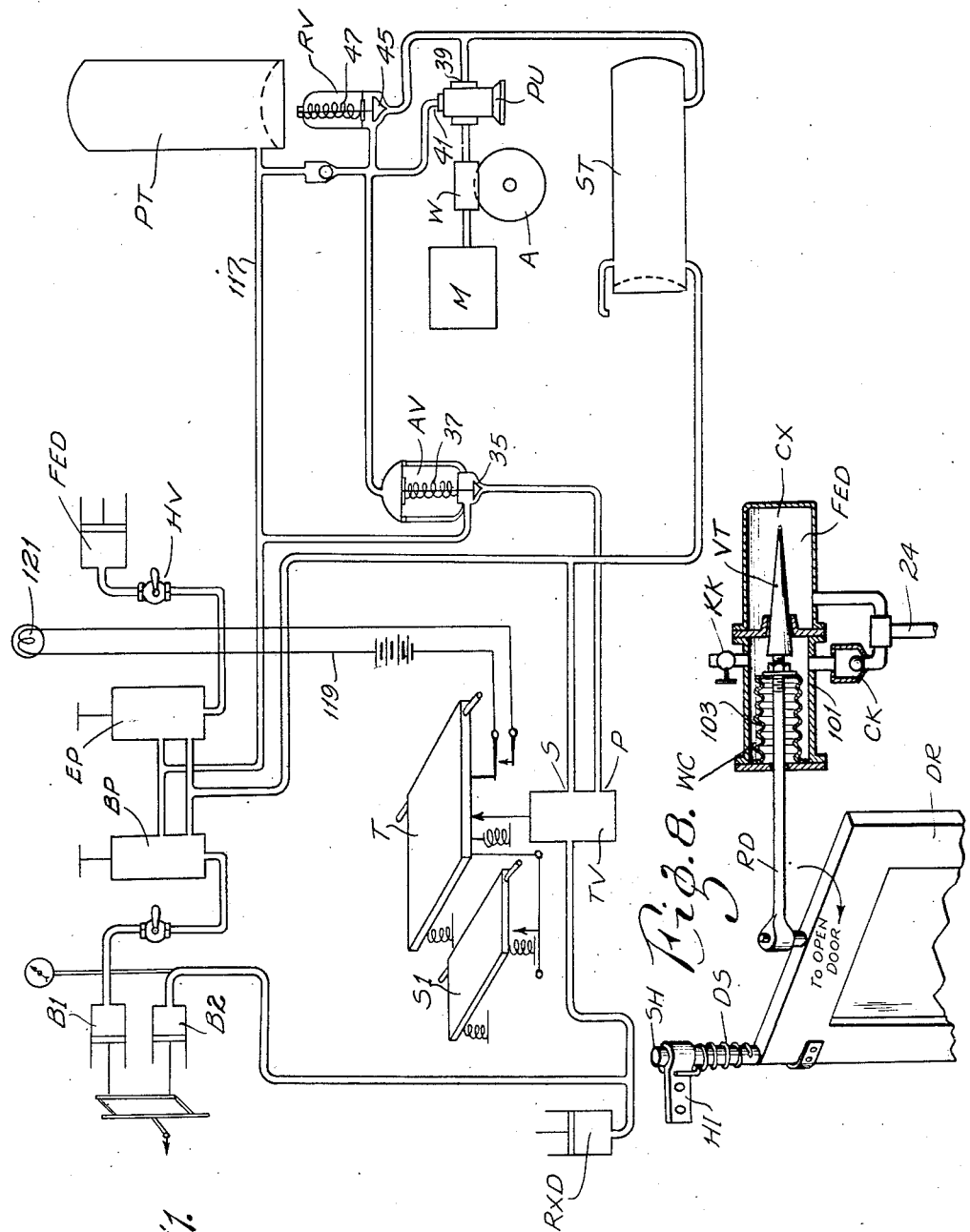

Dec. 9, 1930.   H. S. PARDEE   1,784,310
CONTROL SYSTEM
Filed Oct. 19, 1929   7 Sheets-Sheet 6

Harvey S. Pardee,
Inventor.
Attorney

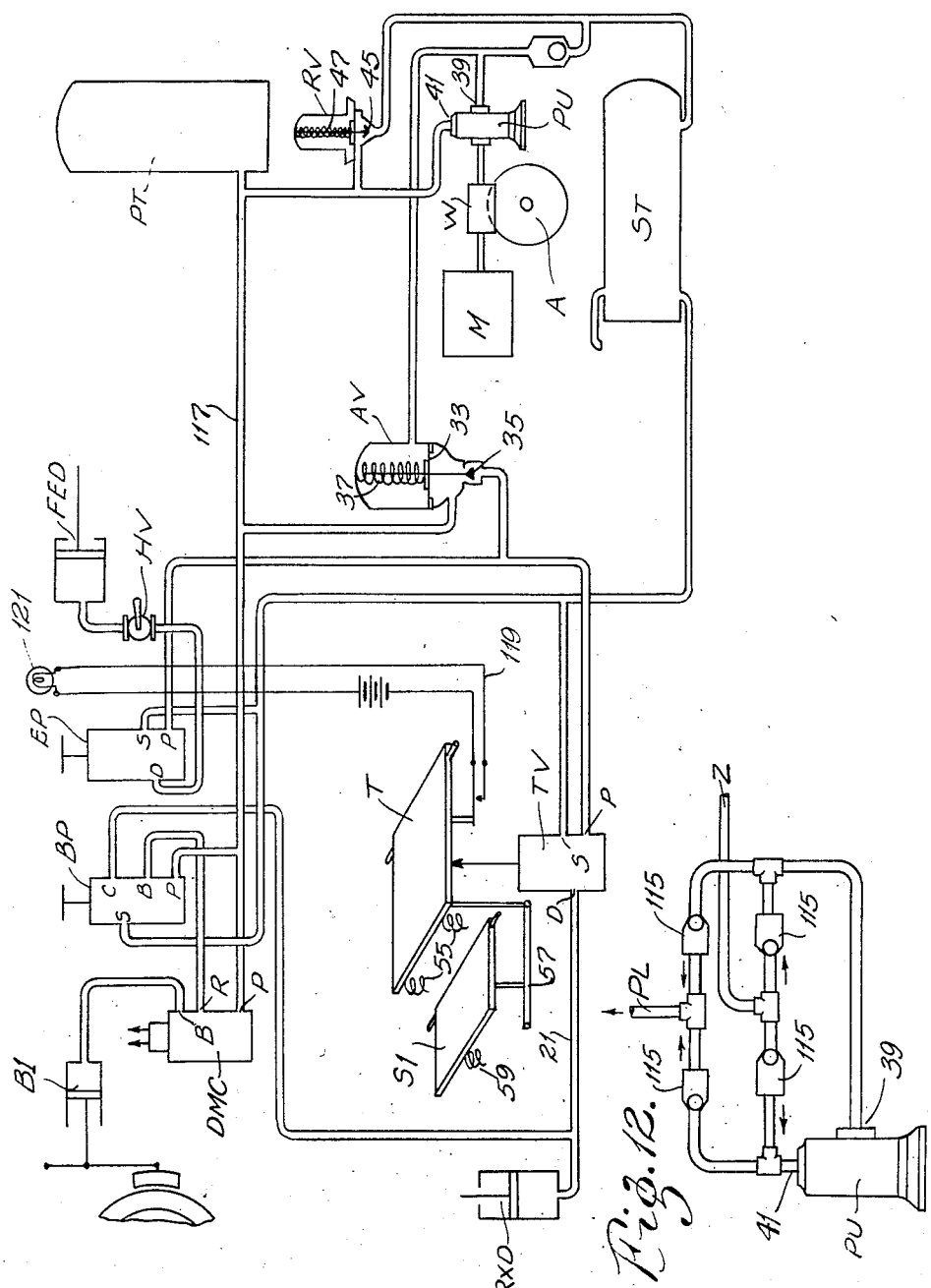

Patented Dec. 9, 1930

1,784,310

UNITED STATES PATENT OFFICE

HARVEY S. PARDEE, OF RAVINIA, ILLINOIS, ASSIGNOR TO JOHN R. BLACKHALL, OF CHICAGO, ILLINOIS

CONTROL SYSTEM    REISSUED

Application filed October 19, 1929. Serial No. 400,870.

This invention relates to control systems, and with regard to certain more specific features, to hydraulic control systems.

Objects

Among the several objects of the invention may be noted the provision of a control system for operating the doors, brakes and related parts of conveyances such as street cars, coaches, busses or the like.

Among other objects, this invention includes the one wherein the operation of the exit door is made independent of the motorman and wholly under control of a leaving passenger, subject only to the single condition that the car be substantially at rest when said exit door is operated. In this connection, it is to be noted that the leaving passenger deprives the motorman of his control of the brake valve after the car has come to a stop, and operates to set said brake valve independently of the motorman, and in addition shuts off the source of the propulsive power.

The invention has among its further objects the provision of a quick-acting, simple, reliable and compact hydraulic control system having a minimum number of parts which, with small energy consumption, are designed to meet in an improved manner all service and emergency conditions. Other objects will be in part obvious and in part pointed out hereinafter.

Applications

It is to be understood that the conveyances or vehicles to which the invention may be applied may be driven by electric or other motors and are provided with entrance and exit doors, preferably with separate entrance and exit doors at the front end and also an exit door at the rear end. The vehicles are also provided with at least one brake, preferably of the friction type contacting with some rotating element of the vehicle.

The invention accordingly comprises the elements and combinations of elements, features of construction, and arrangements of parts which will be exemplified in the structure hereinafter described, and the scope of the application of which will be indicated in the following claims.

Drawings

In the accompanying drawings in which are illustrated several of various possible embodiments of the invention, Fig. 1 is a hydraulic and electric circuit diagram;

Fig. 2 is a fragmentary hydraulic circuit diagram, showing only certain filling circuit connections taken from Fig. 1;

Fig. 3 is a fragmentary hydraulic circuit diagram, showing only certain relief circuit connections taken from Fig. 1;

Fig. 4 is a fragmentary hydraulic circuit diagram, showing only a braking circuit connection taken from Fig. 1;

Fig. 6 is a detail cross section of a door engine pedal valve;

Fig. 7 is a detail cross section of a brake pedal valve;

Fig. 8 illustrates a door operating engine and mechanism connecting the same with a door;

Fig. 10 is a diagram illustrating an alternative dead-man circuit;

Fig. 11 is a diagram illustrating an alternative brake system;

Fig. 12 is a view showing certain reversing connections from a pump.

Similar reference characters indicate corresponding parts throughout the several views of the drawings.

Introductory

Figure 5:
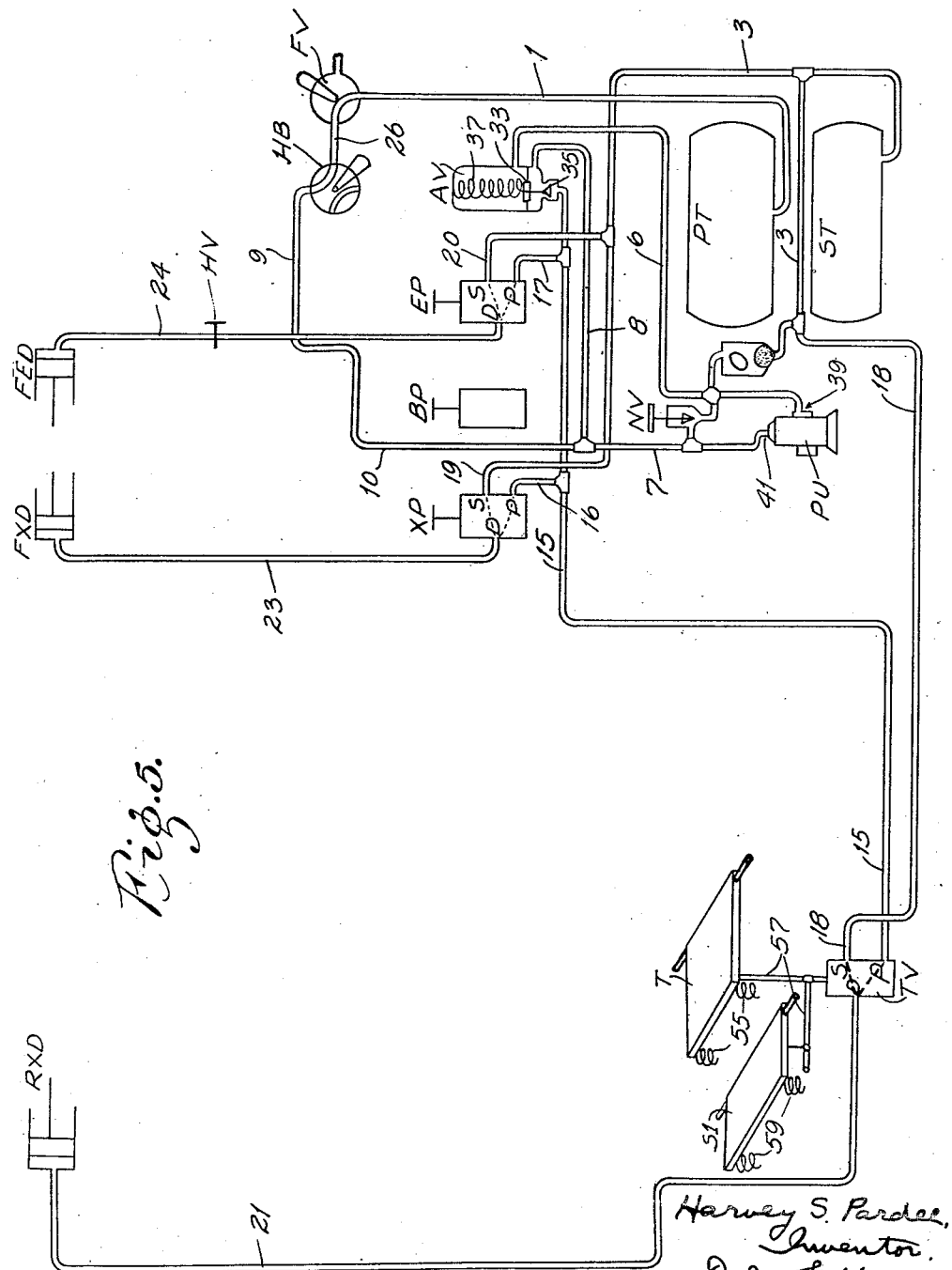
Fig. 5 is a fragmentary hydraulic circuit diagram, showing only door opening circuit connections taken from Fig. 1.

Although the invention herein is directed primarily to certain circuit connections and combinations, before said combinations can be understood there arises the need for descriptions of the various elements used.

Furthermore, it is believed that certain of said elements have novelty per se. For these reasons a list of the various elements and their connections and uses will be set out, prior to describing the operation of the invention as a whole.

Car body

As above forecast, the present invention is applicable to the so-called one man car or to cars manned by more than one operator. Cars of this type are well known as, for instance, the type in which there is provided entrance and exit doors at the front and an exit door at the rear and also the type in which there is a front entrance door and a rear exit door in which the passenger load circulates only from front to rear, there being no front exit. But the two types of cars described may comprise alternate operations on a car having a front entrance, front exit and a rear exit and/or rear entrance. The point here desired to be made is that the system herein described may be varied in its application to various body constructions.

Driving and braking means M, W and A

It is clear that the drive for the vehicle herein described may comprise the spur or worm gear type with brakes operating in connection with a drive shaft or the wheels. In Fig. 1 such a drive is diagrammatically illustrated as comprising a motor M driving a worm W, the latter meshing with a suitable worm gear A on an axle of the vehicle. As above indicated, the brakes may include shoes which are pressed directly against the wheels of the vehicle or may comprise other frictional means pressed against rotating parts such as discs associated with the drive shaft of the motor M or may comprise other optional methods of accomplishing braking. For purposes of description, the braking system herein is represented as comprising a system of brake cylinders B1 which operate friction brakes on the driving parts of the vehicle.

Automatic valves AV and RV

Indicia AV represent an automatic valve for controlling the supply of fluid pressure to certain door engines. This valve has a diaphragm 33 connected to a valve head 35. On the upper side of the diaphragm is a compression spring 37 in a chamber connected to the suction side 39 of a pump PU (see line 6). On the lower side of the diaphragm is a chamber connected to the pressure side 41 of the pump PU (see lines 8, 7). This chamber also contains the valve head. The lower end of the valve chamber communicates with the pressure ports P of certain valves EP, XP and TV controlling said door engines (see lines 17, 14, 16 and 15). When the pump is operating, excess pressure on the lower side of the diaphragm closes the valve 35 and shuts off the supply of fluid pressure to the door engine valves. When the pump is stationary, the suction and delivery pressures quickly equalize through a metering by-pass valve NV and the valve AV opens under the action of the spring 37, thus supplying pressure to the ports P to the door engine valves XP, EP, TV.

The valve RV comprises a relief valve arranged to short-circuit the delivery from the pump PU when the pressure in the tank PT exceeds a predetermined maximum. This comprises a diaphragm type, spring loaded, relief valve. As will be made clear, the pump runs during the time that the vehicle is in motion and an average excess pumpage is assured if the pump is proportioned to provide sufficient quantity under all demands. When the maximum pressure is reached the pressure on the under side of the diaphragm 43 of valve RV lifts valve head 45 and permits the fluid delivered by the pressure side of the pump to short-circuit to the sump tank ST (see lines 7, 8, 5, 3). The diaphragm spring 47 is of the compression type.

Foot controlled valves BP, EP, XP and TV

The valve BP comprises a brake pedal valve, the details of which are shown in Fig. 7. This valve comprises a port P leading to an internal poppet valve HS4 which is closed by a spring HS5, as well as by fluid pressure, and guided by a bushing HS3. Another port B leads outwardly from a four-way valve HB by way of line 25 (see Fig. 1), and thence to the brake cylinders B1 (see line 12). A port S of the valve BP leads to the sump tank ST (see lines 13, 3). A port C leads to a magnetically operated valve FF. A stem HS7 (Fig. 7) leads through packing material HS10 and a guide bushing HS16 and is adapted to be depressed by foot or hand pressure exerted by the operator of the vehicle. On this stem HS7 is located a solid piston HS8 and below the latter, is located an axially perforated piston valve HS6. In the position shown in Fig. 7 the stem is fully depressed and pushes against the end of the stem of the poppet valve and opens the latter and permits fluid pressure to pass to the under side of the solid piston HS8, thus tending to raise it and the stem. At the same time pressure passes through HS6 to the port B and thence to the brake cylinders. Thus the pressure on the under side of the solid piston HS8 tending to raise the stem is in proportion to the pressure on the brake cylinders. If the pressure exerted on the stem by the operator is reduced the valve stem rises and the piston valve HS6 eventually cuts off the pressure supply to the brakes. Further reduction of the pressure on the stem causes it to rise still further and the lower edge of the solid piston HS8 uncovers the port to the exhaust S and pressure on the brake line is reduced as the piston rises or is kept in exhausting position. At the same time the pressure on the under side of the solid piston is always proportional to the pressure on the brake line. The distances may be adjusted so that there is an appreciable lap between the pressure supplying and exhausting positions. When the operator removes pressure on the stem entirely, the stem rises, allowing the poppet valve to rise also, and the latter finally closes and shuts off with a tight seal the pressure supply to the piston valve. Thus the piston valve HS6 is relieved of the function of sealing against pressure, the poppet valve HS4 assuming this function. It is to be noted that the poppet valve seals tighter as the pressure builds up; whereas a piston valve is always subject to some leakage. Such leakage has been here prevented.

Above the solid piston is a chamber communicating with port C which leads to the magnetically controlled valve FF. When fluid pressure is admitted to port C from the supply tank, the pressure on the upper side of the solid piston depresses it and thus supplies pressure to the brake system independently of the operator. The operation will be further clarified in the description of operation of the apparatus, taken as a whole.

The valve EP (Fig. 6) is also a pedal valve which, like the valve BP is adapted to be manually depressed by the operator. Its purpose is to control the opening of a front entrance door by means of a suitable door engine FED (Fig. 1). The valve EP per se is detailed in Fig. 6 and comprises a three-way valve with a pressure supply port P, an exhaust port S leading to the sump tank ST (see lines 20, 13, 3) and a delivery port D leading to the door engine FED (see line 24). The stem of the poppet valve HS4 therein pilots in the operating stem HS13 and when the latter is depressed, the poppet is opened, thereby communicating fluid pressure to the door engine FED by way of port D. The piston valve HS6 is perforated axially so that the pressure on the two sides is balanced. In the position shown the stem is fully depressed and the pressure line is open to the delivery port D. As the valve stem is raised the poppet valve HS4 is first closed, making a tight seal. Next the exhaust port S is put in communication with the port D and the fluid in the door engine line exhausted to the sump through port S. The upper part of the valve stem passes through two packing rings HS10 set in cups and between the two is a space 71 connected by a drilled hole 73 with the exhaust port. Therefore if any fluid passes the lowest packing ring it will be drained to the exhaust line before it can reach the upper packing and thus no fluid can escape from the system.

It will be noted in connection with the descriptions of valves EP and BP of Figs. 6 and 7 respectively, that corresponding reference characters indicates parts having corresponding shapes and functions.

The valve XP (Fig. 1) comprises another pedal valve similar to valve EP and has for its purpose the operating of the front exit door engine FXD, similar to the manner in which the valve EP operates the front entrance door engine FED. The two front door pedals XP and EP are juxtaposed so that either or both may be depressed simultaneously with the brake pedal; or the brake pedal may be depressed alone.

The treadle valve TV is a valve also similar to the valves EP and XP, except that the stem thereof is connected to a treadle T and step S1 in such a manner that depression of either the treadle or stem depresses the stem and supplies pressure to the rear door engine and opens the door in the same way as EP opens the front entrance door. When both treadle and step are in raised position valve TV is set to open the line from the door engine to the exhaust and permit the door to close itself by action of its return spring hinges which forces the fluid from the door engine when the door is closing.

Hand controlled valves HB and FV

At HB is illustrated a hand brake valve which may comprise an ordinary fourway valve of the tapered plug type. In the position shown in Fig. 1 it is in normal position. When the handle is put in the position shown by the dotted lines the pressure tank is put into direct communication with the brake cylinders and all of the pedal valves and door mechanisms are out of service. The valve HB will usually be placed in the "out of service" position when the car is out of service or left standing for a time. If the car is left standing with the brakes applied by the brake valve BP, due to opening of the dead-man circuit and release of the magnetically operated valve FF, the pressure will slowly but gradually leak past the piston in valve BP, and finally all of the fluid in the pressure tank PT will pass to the sump tank ST. But valve HB can be made inherently tight and hence the pressure will be maintained indefinitely without any leakage when valve HB is used to hold the brakes. Valve HB also serves as an auxiliary valve for use in case of accident or damage to the other valves and/or mechanisms.

Valve FV is a three-way hand valve, of the tapered plug type. It is used in filling the supply tanks PT and ST with air and hydraulic fluid. The position shown is that for normal operation. When the handle is in the position shown by the dotted lines in Fig. 1 and solid lines in Fig. 2 the pressure tank PT is connected to the air valve AC and a hand pump HP.

Slip valve NV

This valve comprises an adjustably throttling, by-pass located between the suction and delivery lines of the pump PU. It augments any pressure equalizing leakage which may exist past the compressing elements of the pump when it stops; and provides a means for controlling the speed of equalization of the pressure on the suction and delivery sides of the pump.

Magnet valve FF, MV

The magnet valve FF, MV is energized by a low voltage dead-man circuit which will be described hereinafter. It includes a pair of contacts LS which are opened when the magnet is deenergized and open the line circuit breaker supplying propulsion power. The magnet MV, preferably of the solenoid type, is connected by a lever to the rotating stem of a three-way valve FF. When the magnet is energized, the port P of this valve FF leading from the pressure system, is shut off and the port C leading to the control chamber of the brake pedal valve BP is connected to the exhaust port S leading to the sump tank ST. When the magnet valve is deenergized the pressure port P is connected to the control port C and the exhaust port S is closed. This communicates pressure to the chamber C of the brake valve BP and acts to set the brakes as described in connection with the description of the brake pedal valve BP.

Door engines FED, FXD and RXD

Indicia FED represent the front entrance door engine shown conventionally as a single acting cylinder and piston. The door is closed by suitable spring hinges not a part of the door engine (see Fig. 8). When the exhaust line is connected to the door engine the springs cause the door linkage to return the piston of the engine and force out the fluid to the exhaust. This flow may be aided by gravity when the door engine is placed higher than the sump tank ST.

Indicia FXD and RXD represent door engines for the front exit door and rear exit doors respectively, said engines being similar in form and operation to said described door engine FED.

In Fig. 8 is illustrated the connection between a door engine and its door, including spring-hinge return.

Pressure is admitted to a chamber WC of the door engine between the inside of the cylinder 101 and the outside of bellows 103. This causes the rod RD to move outwardly to open the door against action of a door spring DS on a door shaft SH which turns in a hinge bearing HI. Fluid passes mostly through a check valve CK and partly into a chamber CX (see the branch pipes from line 24). The door is opened when pressure is relieved from line 24.

A spring DS pushes the door toward closing positions and the rod RD into working cylinder WC. The check valve CK seats, causing all of the fluid to pass through the annular space around valve VT. The valve VT can be so shaped as to regulate the angular velocity of the door closing at any point and prevent slamming or too great a speed at any point in its travel. KK is a cock for venting air from the system when it is initially filled with liquid. It is important that no air be trapped in the system if it be hydraulic; otherwise the engines will not be properly responsive to their control valves.

The bellows 103 are preferably of metal spun into the shape of cylinders with corrugated cylindrical surfaces to provide for expansion and contraction in axial directions. Or the bellows may be made up of separate discs soldered or welded together to form a bellows structure. Both methods are in common use. Preferably the pressure is exerted on the outside of the bellows as this sets up forces analogous to a spring in tension and hence prevents buckling. If the pressure is exerted on the inside of the bellows, the forces set up are analogous to a spring in compression with consequent tendency to buckle, necessitating use of guides and the like which are not wholly effective.

Bellows have important advantages over piston cylinders as follows:
 (a) No stuffing box is necessary for the rod.
 (b) No piston rings or cups are needed.
 (c) The system is closed with absolutely no leakage. Leakage in a hydraulic system is a vital factor because if it be not caught and returned to the sump it will escape from the system and eventually render the braking and door means inoperative. When the brake or door engine cylinder are located below the sump tank it becomes awkward to collect leakage and return it to the sump. From a practical standpoint a closed system using bellows or the equivalent for cylinders is desirable, unless leakage can readily be returned by gravity to the tank.
 (d) Excess pumpage and pumping equipment (large in any event in the case of air) is avoided when there is no leakage.

Items (a), (b) and (d) effect savings in both first cost and maintenance.

Rear treadle and step T and S1

The letter T indicates a preferably small, hinged platform or treadle placed inside of the rear door exit, arranged so that a passenger upon leaving the car by this door will manually step on the treadle and depress it slightly against the action of compression springs 55 therebeneath. The treadle is articulated kinematically with a step S1 so that both work in unison in actuating a switch TS and the valve TV; or, the platform treadle and the step may independently operate the switch and valve. The former method is indicated in Fig. 1.

The step S1 is placed outside or inside of the rear door of the vehicle. The tread of this step S1 is permitted to assume slight downward movement of its outer edge when alighted upon by a passenger and this movement is utilized to actuate the treadle valve TV and the treadle switch TS, movement being effected through the treadle T by way of linkage 57. The step S1 is maintained in the slightly raised position by suitable springs 59 therebeneath which are overcome by the weight of a passenger on the step. When the passenger leaves the car and alights from the step the springs raise it and actuate switch TS and valve TV. It is to be understood that this is preferably not a folding step, the vertical movement being restricted to approximately one quarter inch.

Hydraulic pump PU

The hydraulic pump PU is preferably of the rotary positive type, and connected directly to a moving axle or propeller shaft of the vehicle. It thus starts and stops with the motion of the car. It should be arranged with a small amount of slip so that when the pump starts the pressure on the delivery side will build up quickly. This pump need have but a small pumping capacity because the demands for liquid quantity are relatively small when non-expansive fluid is used instead of an expansible gas.

Check valves O, AC and CR

The check valves used herein comprise the parts indicated by letters O, AC and CR in Fig. 1. These valves require no further description, inasmuch as their construction is well known. They permit flow in one direction (to be set out) but not in a reverse direction.

Filter AF

The air filter AF is provided for maintaining the purity of the air that passes into a sump tank ST, to be described. This filter AF also functions as an air vent when liquid enters the tank ST so as to displace the air therein. The filter AF is connected by a line 4 with the sump ST in such manner that its elevation is above the liquid in the sump. The elevation of the opening of line 4 in the sump ST is also normally above the liquid level although not always so.

Auxiliaries BY, DC, FP, G, HP and HV

The device BY is a battery, preferably of low voltage, for operating the magnet MV and certain signal lights.

The device DC is a drain cock on the under side of the sump tank for draining the same; and also for drawing off any water which may condense or dirt which may collect in the sump tank ST.

FP comprises a filling plug for filling the sump tank with fluid. It consists of a funnel and stop cock.

G is a gauge for indicating the pressure in the pressure tank.

Indicia HP represent a hand pump for filling the pressure tank PT from the sump tank ST when the equipment is initially put into service. This pump has the inlet and outlet check valves 59 and 61 at intake and delivery respectively. The pump HP is not always essential, nor the charging means through 63 and AC, because the car could be run for a distance without brake pressure until the regular pump PU had pumped the fluid from ST to PT; but it is usually desirable to start with sufficient brake pressure immediately available. The hand pump also serves as an emergency supply in case of accident to the pump PU. It will be seen from the above that means for placing air under pressure in the pressure tank may comprise temporarily operating either of the liquid pumps PU or HP so as to bring the pressure up from an initial atmospheric pressure to the operating pressure; or using the charging means AC, 63.

HV is a holding valve, used in connection with the front door engine FED, arranged so that it may be closed to keep the door from closing, when desired, with the door pedal released.

Tanks PT and ST

The tank PT comprises a pressure tank designed to withstand the air pressure used and to be air, oil and water tight, for example the tank pressure may be 100 pounds per square inch.

The sump tank indicated by indicia ST, is under atmospheric pressure and preferably placed at the lowest part of the system to receive the drain from the door engine and brake cylinders. It is provided with the drain cock DC and an air vent leading from the top of the tank to the filter AF which filters the air as it passes in and out of the tank as it is alternately partially filled and emptied. The size of this tank is preferably such that when full it will hold such a quantity that when substantially all of its contents is pumped into tank PT, it will raise the pressure in tank PT from minimum to slightly above maximum pressure, providing tank PT is initially filled with air at the minimum operating pressure.

Diaphragm switches SL and RS

The switch SL comprises contacts 49 in a battery-stoplight circuit adapted to be operated by movement of a diaphragm 51. The chamber on one side of the diaphragm 51 is connected to receive pressure from a brake valve BP (see lines 25 and 29) before lighting the stoplight to indicate "stop" thus warning the drivers of vehicles following that the car herein described is about to slow down or stop.

The switch RS is of similar type but wired into what is known in the art as a dead-man control circuit, said switch RS being arranged to open the circuit and thereby set the brakes when the rear door is open. The upper side of the diaphragm 53 is connected to the pressure of a supply tank PT (see lines 32, 9, 26, 1), while the other side of the diaphragm is connected to a rear door engine RXD (see lines 22 and 21). When the pipe 22 is not under pressure, that is, when the rear door engine is in door closing position the diaphragm of switch RS will act to close the contacts in the dead-man circuit because of the action of the supply pressure in pipe 32. When the rear door engine is under pressure and the door is opening or being held open by the engine, then substantially equal pressure will be applied to the other side of the diaphragm of RS and thus counteract the opposing pressure from PT. The spring 54 will then act to open the contacts. As soon as the rear door engine line is connected to its exhaust, the pressure will again preponderate on the upper side of the diaphragm, and when the differential pressure has reached a predetermined amount, the diaphragm of valve RS will function to close the contacts. The action of the valve RS is thus dependent upon the pressure differential existing between the supply tank and the door engine and not upon the absolute pressure existing in the system or the supply tank PT. If the differential adjustment of the instrument RS be made small a very small time interval will take place between the instant when the door starts to close and the brakes are released and power applied for propulsion.

Switches BS, CH, FS, R and TS

An electric back-up braking switch BS is located at the rear end of the vehicle, or at any other desired point, arranged to open the circuit controlling the magnet valve FF, MV, and thus supply fluid pressure to the port C of the brake valve BP which applies the brakes. At the same time the supply of motive power to the vehicle is cut off by contacts LS on magnet MV.

A switch CH is located on the handle of the motorman's controller regulating the supply of propulsion power. This is called a dead-man switch because it opens when the operator, as in death, lets go of the handle. Opening of this switch releases the magnet MV and valve FF so as to set the brakes and cut off the supply of power by means of contacts LS controlling the line circuit breaker.

The switch FS comprises a foot operated push button convenient to the operator of the vehicle and connected to shunt the dead-man switch on the controller handle CH, so that the operator may have both hands free when required while the car is moving.

The device R is a switch in the dead-man circuit and mechanically connected with the reverser handle of the car. When the reverser handle is in forward or backing position, the dead-man circuit is closed at this point, but when the handle is in neutral position the dead-man circuit is open. This neutral position is the position of the handle when the car is out of service and is usually maintained and locked with a key. This arrangement insures that the brakes are set and the car impossible to operate while thus locked.

The switch TS is operated by depression of the treadle or rear step so as to close a circuit from the battery through a signal lamp RDL in front of the motorman to indicate when a passenger is standing upon the treadle or step. In parallel with this signal lamp is a lamp SW located in the riser under the treadle to illuminate the step whenever it is about to be occupied.

Lamps RDL and DML

The signal lamp RDL, as indicated in connection with the description of the switch TS, is in circuit with said switch TS so that when the switch TS is closed by depression of treadle or rear step, said signal lamp RDL (near the motorman) will indicate when a passenger is on the treadle or step.

The lamp DML comprises a signal in the dead-man circuit which burns whenever said circuit is closed and in running condition and indicates to the motorman that the brakes are not set and that the line circuit breaker is not opened by action of the dead-man circuit.

Preferred connections (in general)

Pneumatic and electrical connections are accurately illustrated in Fig. 1 and comments thereon will be made in connection with the description of operation which follows. In order that said description may be clarified, Figs. 2, 3, 4 and 5 have been introduced in order to picture certain sub-divisions of the system. Said Figs. 2, 3, 4 and 5 each duplicate portions shown on Fig. 1 but each shows a different combination of elements concerning different phases of the operation.

*Operation (filling circuit connection, Fig. 2)*

Assuming the tanks PT and ST to be empty and the valve FV in the position shown in Fig. 2, (dotted line position in Fig. 1) an air hose 63, connected with a source of compressed air, is connected to the air check valve AC and air is passed to the pressure tank PT by way of line 1. When the pressure, as indicated on the guage G, reaches the minimum at which the door engines and the brake cylinders will operate properly the air hose 63 is removed. Next the hydraulic fluid, preferably a suitable grade of oil, is put into the sump tank ST through the filling plug FP and line 3. As oil enters this tank it forces out the contained air through the vent 4 and air filter AF. When the tank ST overflows through filter AF the filling plug FP is closed. Then the hand pump HP is operated and most, but not all, of the fluid in tank ST is pumped (through lines 3, 2, 1) into the pressure tank PT. The sizes of the tanks PT and ST being in the correct proportion, the pressure in tank PT will now be near the maximum pressure suitable for operating the brakes and door engines. The hand pump HP is stopped and valve FV turned to its normal position indicated by the solid lines in Fig. 1.

*Operation (relief circuit connection, Fig. 3)*

When the car is put in motion the pump PU starts to pump oil, drawing from tank ST through pipe 3 and check valve 0 to the suction side 39 of the pump and thence delivers under pressure through pipes 7, 10, 9, 26 and 1 to the pressure tank PT. However, branching from this run 7, 10, 9, 26 and 1 is the pipe 8 leading to the relief valve RV which is set to open under the maximum pressure and by-pass the output of the pump through lines 5 and 3 back to the sump tank ST. Thus the building up of more than the predetermined pressure in tank PT is prevented, even though the pump runs continuously. When, as will be particularized hereinafter, fluid is withdrawn from the tank PT and the pressure therein and lines connected therewith falls to the predetermined minimum at which valve RV is set to close, then the output of the pump passes to the tank PT or directly to the devices which may happen to be using the fluid at the time.

*Operation (braking circuit connection, Fig. 4)*

Assuming that the operator is to apply the brakes, the pedal BP is depressed and fluid under pressure is permitted to flow from tank PT through pipes 1, valve FV, pipe 26, valve HB, pipes, 9, 10, 11 to the port P of valve BP, thence, as described under the description of valve BP, to the port B leading through pipe 25, valve HB and line 12 to the brake cylinders B1. The piston rods and the linkages operated from these cylinders move the brake shoes into frictional contact with the wheels, the axle, or propeller shaft of the vehicle, as the case may be. In releasing the brakes the pedal of PB is raised. This cuts off port P and connects port B to port S. Suitable springs in the brake cylinders move the brake shoes out of frictional contact and force the fluid back through line 12, valve HB and line 25, ports B to S, and through pipes 13 and 3 to the sump tank ST. Valve BP, as described above, is arranged so that the pressure delivered to the brake cylinders is adaptable to any adjustment from zero to maximum, according to the amount of pressure applied on the pedal and the reaction tending to oppose the movement of the pedal downwards is always proportional to the pressure existing in the brake line, i. e., the amount of brake pressure applied depends upon the amount of foot pressure exerted by the operator on the pedal.

When the brake pedal is connected directly to the valve stem, as illustrated in Fig. 1, the movement can be made as small as desirable, down practially to the amount of lap of piston valve over pressure and exhaust ports. A very slight movement beyond this will build up or release pressure. The operator then merely varies his foot pressure, the pedal remaining almost but not quite stationary.

Figure 9:
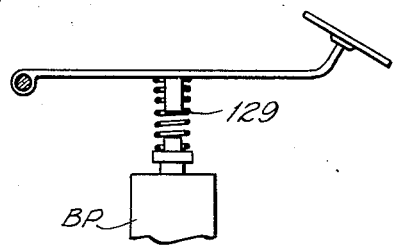
Fig. 9 illustrates the use of a spring below a brake pedal.

If, in order to simulate automobile operation, it is desired to add appreciable movement to the pedal it is only necessary to insert a compression spring 129 between the pedal and the valve stem (see Fig. 9). The stress in the spring then reacts on the pedal always in exact proportion to the pressure existing in the brake line.

*Operation (door controlling circuit, Fig. 5)*

It may be desirable to prepare for opening one or both of the front doors as the car is being decelerated. In this event the operator depresses one or both of the pedals of valves EP or XP simultaneously with the pedal of valve BP. This puts in communication the port P of the door valve with port D. However, nothing happens to the doors while the car is in motion, because there is no pressure on the lines leading to ports P. These lines are controlled by the automatic valve AV. As above described AV is the diaphragm valve, spring loaded on the upper side and connected to the suction side of the pump by line 6. The under side of this diaphragm is connected to the pressure side of the pump through pipes 8 and 7, and to the pressure tank PT through lines 8, 10, 9, valves HB, FV and line 1. When the pump is running the pressure difference on the two sides of the diaphragm is equal to the pressure difference at the pump. This closes the valve connected to the under side of the diaphragm. When the pump is substantially stopped, the predetermined leakage through the metering valve NV quickly builds up a pressure on the suction line being held by the check valve O, and this pressure communicates through pipe 6 to the upper side of the diaphragm of AV, equalizing the pressure on the lower side, which, together with the action of the light spring 37 pushes the valve disc 35 down and open. Pressure is then admitted to the lines leading to the valves controlling the door engines and if any or all of these are set for door opening, fluid will flow through the valve to the door engine cylinder and with suitable pistons and crank linkage, cause the door to open against the opposition of its return springs. When the door valve pedal is released the port D is connected with port S and the springs on the door hinges cause the pistons to force the fluid out of the engine and back through the valve and pipes 19 and/or 20 and/or 18 to pipe 3 and tank ST. It is to be noted that according to the amount of inherent hydraulic slippage in the pump PU, the valve AV can be adjusted to open slightly before the pump wholly stops and thus the doors can be opened, if desired, slightly before the car has come to an absolute stop. This feature conserves time in length of stops.

If desired the operator may depress both of the valves XP and EP together with the brake pedal and thus open both front doors when or as the car stops; or, he may depress the brake pedal without the door pedals and thus come to a stop without opening the doors. Suitable juxtaposition of the pedals XP, BP and EP as shown, permits this selective and/or simultaneous action.

In one-man cars it is highly desirable to circulate the load in through the front entrance and out through the rear exit. Thus passengers desiring to leave the car go to the rear and stand on the treadle T.

The movement of the treadle puts port P of valve TV in communication with port D thereof. It is to be remembered that the valve TV is operated by the treadle in substantially the same way that the motorman operates the valves EP and/or XP. When the car comes to a stop, and this may be for any reason such as cutting off the source of power, or obstructions on the track or road, the automatic valve AV admits hydraulic pressure by way of line 15 to the valve TV and through port P to port D and thence to the door engine line 21. This causes the door to open. As the passenger alights he steps upon the step S1 which is connected to perform the same functions as the treadle T and this holds the door open until both treadle and step are free. After the weight of the passenger leaves the treadle T and step S1, these members rise to their normally raised positions due to the springs thereunder.

*Operation (safety circuits, Fig. 1)*

The movement of the treadle T when a passenger is thereon also closes the switch TS in a signal circuit including the battery BY and the signal lamp RDL. The lamp RDL is located near the operator of the vehicle and he is therefore notified to stop the car at the next stopping point. It is to be understood that the usual push buttons and buzzers or mechanical signals may be used in addition to this treadle signal, or instead of the treadle signal.

In connection of the operation of the treadle valve TV, it is to be noted that when pressure is admitted to the rear door line 21 it also communicates by way of line 22 with the diaphragm chamber of the diaphragm-operated switch RS. The resulting diaphragm movement opens the dead-man circuit which includes the magnet valve FF, MV. The magnet MV opens the three-way valve FF per se, thus admitting pressure to port C of the brake valve BP by way of line 27 and causes said valve BP to function as if depressed to set the brakes (see Figs. 1 and 6). Pressure is admitted to the three-way valve FF from line 10, the said positioning of the valve FF connecting ports P and C thereof (see Fig. 1).

Simultaneously with the above operation, the magnet MV opens contacts LS which control power delivery to the vehicle. For instance, in the case of a gas engine drive, the contacts LS may be in the ignition circuit; and in the case of an electric motor drive the contacts LS may control an opening coil of a line circuit breaker. Thus the event of a passenger standing on the treadle T lights the operator signal lamp and as the car comes to a stop opens the rear door, shuts off the power and sets the brakes. In connection of the brake setting, it is to be noted that the operator's brake setting is not interfered with, because the passenger-controlled brake setting is only effective as a safety measure after the car has been brought to a reduced speed. This is because the automatic valve AV does not permit a pressure supply to the line 15 from which the passenger-operated functions of door opening and braking receive their energy. But after the car has stopped, the operator's brake operation is dominated by that of a passenger standing on either treadle or step.

When the treadle T and step S1 are both free, the reverse operation takes place, the dead-man circuit is restored, the brakes released, the power supply re-established and the signal light RDL turned off.

In connection with the door operation, it will be noted that the single-acting engines for opening the same and the spring means for closing the same makes it possible to push the doors open from the outside against the action of the return springs for the same and it is also possible for a passenger on the inside to open the door by grasping a handle without the aid of the door engine. This feature is valuable in making emergency entrance or exit should the motorman become incapacitated. Likewise, it is possible to close the door by pushing it even though the engine is tending to open it.

Another function of the dead-man circuit is to shut off the sources of propulsive power and apply the brakes to stop the car independently of the motorman, should he become incapacitated or for any reason let go the switch maintaining this circuit. It comprises a push button switch CH in the motorman's controller handle which button opens the dead-man circuit when the handle is let go. This switch is shunted by a foot operated switch FS which can be held closed by foot pressure when the motorman wishes to have both hands free. From the switch CH the dead-man circuit passes also through another switch R associated with the conventional reverser handle. When the latter is in either forward or backing position the dead-man switch at that point is closed. When the reverser is in neutral position the dead-man circuit is open. When the car is out of service it is usual to lock the reverser in neutral position with a key.

The diaphragm-operated switch SL operated by line 39 leading from the lines 12, 25 (associated with the brake cylinders B1) is adapted to close and light the stop light SS whenever there is pressure in the brake cylinder lines 12, 25.

It will be appreciated that it is often desirable to back one-man cars around a Y or backward through a switch and this movement must be controlled from the rear end. A normally open backing switch controller is usually positioned in the rear end. At the front end of the car the motorman sets his reverser in backing position and the controller on about the second running position. He then applies a special clamp to the controller handle which holds it in that place and holds the dead-man button closed down. Going to the rear he operates the backing switch controller handle in backing the car. In order to brake from this position I provide, in connection with the backing switch, the pair of contacts BS in series with the dead-man circuit so arranged that they are normally closed but are opened when the backing handle is moved negatively past the off position and away from its driving positions. This permits braking and stopping of the car from the rear.

In backing the car the pump will operate in reverse direction (if it is a reversible pump) and in order to prevent building up excess pressure on the side which is normally suction I provide a check valve CR which relieves said excess pressure to the other side of the pump while backing.

In the case of reversible or so-called double end cars in which the pump may run continuously in either direction, I provide in connection with the pump a system of four check valves 115 as shown in Fig. 12. The arrows indicate the direction in which the check valves permit the fluid to flow from points of high to low pressure. The pressure line PL then is always a delivery line and the suction line Z always conveys fluid to the pump. In this modification the check valve CR is unnecessary.

*Alternative forms*

In Fig. 10 is illustrated an alternative brake and door piping system including an alternative dead-man valve.

In this modification the dead-man valve DMC includes a solenoid therein and operates to transmit fluid pressure directly from the tank PT (see line 117) to the port P of said valve DMC and thence to the port B of the valve DMC (when the valve is de-energized) and thence to the brake cylinder B1. When the valve DMC is again energized, port B connects with port R and thence to port B of the brake pedal (in released position) to port S and thence to the tank ST. This releases the brakes.

When the brake pedal BP is depressed and valve DMC energized, pressure goes to port P of valve BP and thence to port B to port R of valve DMC and thence to port B to the brake cylinder B1. Hence either of valves DMC or BP can set the brakes independently but both must be set in release positions in order to release the brakes.

The treadle valve here acts directly (hydraulically) on the brake pedal valve BP, instead of indirectly by means of an electric circuit including the pressure switch RS and magnet valve MV, as shown in Fig. 1.

In Fig. 11 is shown another modified brake system in which the treadle valve TV works a separate brake cylinder B2 independent of the cylinder B1 operated by the motorman. It is also to be noted that the automatic valve AV has atmospheric pressure on the underside of the diaphragm and a check valve on the pressure side of the pump. When the pump stops, pressure on the delivery side thereof drops to that of the suction line. This permits pressure to pass from pressure tank PT to the treadle valve TV by way of the automatic valve AV so that when the treadle is operated the rear door engine RXD and the brake cylinders B1 will function.

In both of the modifications a signal circuit 119 is adapted to be closed upon the pressure of the treadle so as to light a signal lamp 121.

Figure 13:
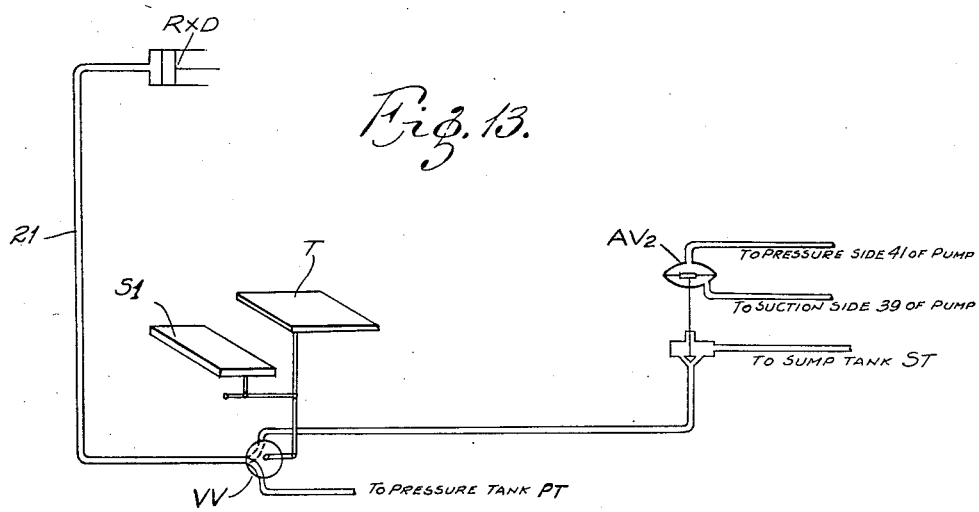
Fig. 13 is a diagram illustrating an alternative door operating scheme.

In Fig. 13 is shown an alternative scheme for closing the doors by pressure and permitting spring opening of the same. In this construction a valve VV is used beneath the treadle and is adapted to be operated thereby. When treadle is raised pressure from tank PT goes directly to door engine to hold the door closed against action of springs which tend to open doors in this case. Stepping on treadle cuts off pressure and connects the door engine line to the automatic diaphragm valve AV2, which, however, is closed as long as the car is running and pressure on the upper side exceeds that on the lower side. When the car stops, the valve AV2 opens and permits the door engine to exhaust its fluid to the sump tank and the door springs open.

Figure 14:
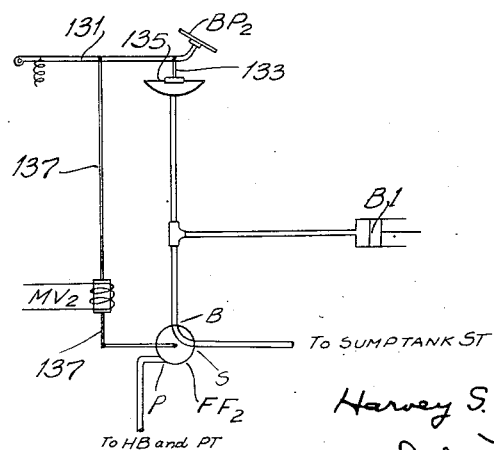
Fig. 14 illustrates alternative brake pedal connections.

In Fig. 14 is shown an alternative system in which a brake pedal BP2 is formed at the end of a spring-held link 131 and a rod 133 connects said link 131 with a diaphragm 135. The pedal BP2 in the position shown, connects the brake cylinder to the sump tank. Depressing pedal BP2 connects brake cylinder B1 to the pressure line, this being done by the linkage connection 137 with valve FF2. The diaphragm 135 provides reaction to the pedal proportional to the pressure reaching the brake line. By placing ports S, B, P close enough together the amount of motion of the pedal can be as little as desired.

The magnet MV2 when energized holds up the pedal in release position; when de-energized it allows the spring to pull pedal down and apply the brakes.

If desired, by means of a lost motion link the pedal itself may be caused to be unmoved by MV2.

Fluid

Although it is possible to apply the present invention to a pneumatic system, it is preferable that a hydraulic system be used. The hydraulic fluid to be used in the present system comprises preferably a liquid relatively non-expansive and non-compressible as compared with gases such as air. It should be selected with a viscosity reasonably constant at the various operating temperatures; it should not corrode metal and should have a low enough vapor tension so as not to create an appreciable vapor pressure at the operating temperatures. It should not deteriorate with time or use. It will be seen from the above that fluids such as are now known for hydraulic braking systems may be used, or oil or the like.

Advantages (1) The present hydraulic system has many advantages over prior pneumatic systems.

For instance, when a valve in a liquid pressure line is closed the energy flow is stopped. When a compressed air line is closed off the flow of energy at the delivery end of the pipe line may not cease, because some uncontrolled energy due to the pressure of the expansible medium in the pipe line has passed the valve and this energy can be governed only by complex arrangements and elaborate counteracting means. Thus it will be seen that the energy of a hydraulic system is simply and directly controllable.

Power consumption in the hydraulic system is much less than in the pneumatic system wherein the air or the like must be used non-expansively, as in direct reciprocating engines exhausting at full pressure. With the hydraulic system there is not only a saving of energy, but what is often more important in a vehicle, there is a great saving in the weight, bulk and cost of compressing equipment. In a hydraulic pump and motor the only loss is in friction, in the pneumatic system practically all of the work of compressing the air is wasted and only the equivalent of the work of ejecting the fully compressed air from the compressor cylinder is used in the engines or brake cylinders.

Pneumatic systems require heavy and bulky cooling systems, comprising usually a coil of pipes to dissipate the energy of compression. Nothing of this nature is required in hydraulic systems.

In pneumatic systems moisture is naturally condensed when the compressed air is cooled. This gives much trouble in obstructing the system when it freezes.

Liquid is much easier to retain in a system than compressed air. Much of the usual air compressor capacity is used in making up leakage in the piping, valves and cylinder packing.

A given amount of energy can be passed through a pipe and valve ports much quicker with a liquid than with air used non-expansively. This results in faster operation in applying and releasing brakes and in opening and closing doors, which comprises an important element in speedy and efficient operation of conveyances.

(2) The motorman is in full control of the brakes at all times when the car is in full motion, assuming that he is attending to his duty. His operation thereon is not interfered with by the positioning of passengers on the treadle. Hence his acquired skill in properly bringing the car to a stop is not interfered with. The reason for this is that the brakes are not operated from the controlling valve TV until the car has reached an optimum low speed or stop at which the motorman would be obliged to completely set his brakes anyway. This will be seen to be true if it be noted that the automatic valve AV normally prevents pump pressure from being transmitted from line 15, said line 15 feeding the control valve TV. After the speed of the car has been reduced to almost zero the valve NV relieves the differential pressure on the two sides of the diaphragm of valve AV. The valve NV functions in this way inasmuch as it is set to by-pass at low pump speeds, not unlike the by-pass action had due to slip past the piston of any pump at low speeds.

After the automatic valve AV opens, pressure is transmitted from line 8 to line 15. Thus all of the valves TV, XP and EP are potentially supplied with pressure inasmuch as they all draw from the line 15.

(3) From the above it will be seen that neither the motorman himself nor anyone else can, by means of the hydraulic system, open any of the doors RXD, FXD or FED, until the car has reached a substantial stop, the reason again being that there is no pressure available at the valves TV, XP and EP until the automatic valve AV permits it to become available at a very low vehicle speed.

(4) The motorman's brake valve cannot be set to release if a passenger is standing on the treadle with the door open. The treadle valve acts on the motorman's valve, taking the control of same entirely away from him and moving the motorman's valve to braking position regardless of his own acts. However, braking is under control of the motorman, even though a passenger is on the treadle, as long as the car is moving at an appreciable speed.

(5) When the car is stopped, either the motorman or the passenger on the treadle can set the brakes independently of the other. Both must have their brake setting devices in release position in order to release the brakes. Neither can release without consent of the other.

(6) The door opening means is operable whenever the car is stationary, even though the brakes are not set. After the car is stationary the setting of the brakes is coincident with the opening of the door. In some prior systems the doors cannot be opened until the brakes are set which means a loss of time in making stops.

(7) Economy of equipment is effected by providing the dead-man control circuit with the dead-man switch and a control-operated diaphragm switch, whereby the same valve FF, MV and connected lines, such as 10, 27, 28 serve for emergency braking and for passenger-positioned-control braking. At the same time the emergency braking can take place at any speed; whereas the passenger-controlled braking occurs only near zero velocity.

(8) The treadle does not prevent the door from being closed manually. The doors are never locked open nor locked shut.

(9) The doors can be opened from the outside by pushing which comprises a valuable feature, inasmuch as it enables entrance to be effected from the outside should the motorman be incapacitated or a panic exist within the car.

To recapitulate, this invention comprises a control system in which a pump operates while the vehicle is in motion. The pump circulates fluid through a system and provides a differential pressure therein. In the system is located means for making use of said differential pressure and also of non-differential pressure which occurs when the pump is not operating, as when the vehicle is stationary, the slip means associated with the pump providing the non-differential pressure.

The system operates so that the pump withdraws fluid from the sump tank and delivers it to the pressure tank, except such portions of the fluid as pass through the by-pass from the pump delivery line to the pump inlet line when the valve in the by-pass relieves at the pre-determined pressure.

It will be understood that the motorman may set his brakes under the differential pressure conditions and that under the equalizing pressure conditions, passenger-operated means may and does set the brakes.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a vehicle control circuit, a pressure tank, a sump tank, means for placing liquid in said sump tank and means for placing air under pressure in said pressure tank, and means for pumping liquid from said sump tank into said pressure tank to further build up the pressure therein.

2. In a vehicle control system, devices adapted to be operated by pressure ranging from a predetermined minimum to a predetermined maximum, a pressure tank, a sump tank, means for placing liquid in said sump tank, means for placing air under pressure in said pressure tank, and means for pumping liquid from said sump tank into said pressure tank to build up the pressure to said maximum.

3. In a vehicle control system, devices adapted to be operated by pressure ranging from a predetermined minimum to a predetermined maximum, a pressure tank, a sump tank, means for placing liquid in said sump tank, means permitting overflow of said liquid during filling and venting of the tank during operation thereof, means for placing air under pressure in said pressure tank, the tank pressure being then at said minimum and means for pumping liquid from said sump tank into said pressure tank to build up the pressure to said maximum.

4. In a control system for vehicles, running gear, means adapted to be operated by a differential pressure, a pump having an outlet and inlet connected to be driven by said running gear at rates proportional thereto, said pump providing said differential pressure and throttled means connecting the inlet and outlet of said pump adapted to permit maintenance of said differential pressure when the pump is operating but to relieve the same when the pump is stationary.

5. In a vehicle, running gear, a pump adapted to be driven from said running gear at a velocity proportional thereto, a system into which said pump circulates fluid to provide a differential pressure, means associated with said system for making use of a non-differential pressure as well as said differential pressure and slip means associated with said pump for providing said non-differential pressure when the pump is stationary.

6. In a vehicle, running gear, a pump adapted to be driven from said running gear at a velocity proportional thereto, a system into which said pump circulates fluid to provide a differential pressure, means associated with said system for making use of a non-differential pressure as well as said differential pressure, and slip means associated with said pump for providing said non-differential pressure when the pump is stationary, said slip means including an adjustably throttled by-pass from the outlet to the inlet of said pump.

7. In a control system, a pressure tank, a sump tank, a pump adapted to withdraw fluid from said sump tank and deliver the same to said pressure tank and a by-pass from the pump delivery to the inlet of the same, and a pressure-controlled valve in said by-pass.

8. In a control system, a pressure tank, a sump tank, a pump adapted to withdraw fluid from said sump tank and deliver the same to said pressure tank and a by-pass from the pump delivery to the inlet of the same and a pressure-controlled valve in said by-pass, said valve relieving at a predetermined maximum pressure and closing to build up pressure in said pressure tank at a predetermined minimum.

9. In a vehicle control system, running gear, a pump driven by said running gear and having an inlet and outlet, said pump while moving maintaining a differential pressure between said outlet and inlet, brakes operable in connection with the running gear, means permitting a motorman to set said brakes under differential pressure conditions, means for equalizing the differential pressures when the pump has stopped, passenger-operated means for controlling said brakes and means associated with said equalizing means permitting the passenger-operated means to set said brakes rather than permitting the motorman to do so when the pressure is equalized and the passenger-operated means has set the brakes.

10. In a brake-control system for vehicles, means permitting an operator to have full control of the brakes when the vehicle is substantially moving and passenger-operated means controlling said brakes when the vehicle is substantially at a standstill, said passenger-operator means dominating said operator's control for applying brakes under standstill conditions.

11. In brake-operating means for vehicles adapted to be operated by a motorman and by passengers, means permitting full braking control by the motorman when the vehicle is in substantial motion, said means permitting braking control by the passenger when the brakes are not set by the motorman under standstill conditions.

12. In brake-operating means for vehicles adapted to be operated by a motorman and by passengers, means permitting full braking control by the motorman when the vehicle is in substantial motion, said means permitting brake application by the passenger to the exclusion of application by the motorman when the vehicle is at a standstill, said means permitting said motorman to have full brake control under standstill conditions when there is no passenger controlling.

13. In a vehicle control system, a pump movable when the vehicle moves, outlet and inlet lines therefor, said pump maintaining differential pressure in the outlet and inlet lines thereof when the pump is in motion and an extension from the source of pressure, automatic means blocking pressure passage to said extension under differential pressure conditions and permitting passage of pressure thereto under equalized pressure conditions and means associated with said pump for equalizing said pressure when the pump has stopped.

14. In a vehicle control system, a pump movable proportionally to the vehicle speed, outlet and inlet lines therefor, said pump maintaining differential pressure in the outlet and inlet lines thereof when the pump is in motion and an extension from the source of pressure, automatic means blocking pressure passage to said extension under differential pressure conditions and permitting passage of pressure thereto under equalized pressure conditions, means associated with said pump for equalizing said pressure when the pump has stopped, a motorman's brake valve adapted to be moved to set the brakes under all conditions and a passenger-operated valve adapted to be moved to set said brakes under equalized pressure conditions.

15. In a vehicle control system, a pump movable proportionally to the vehicle speed, outlet and inlet lines therefor, said pump maintaining differential pressure in the outlet and inlet lines thereof when the pump is in motion and an extension from the source of pressure, automatic means blocking pressure passage to said extension under differential pressure conditions and permitting passage of pressure thereto under equalized pressure conditions, means associated with said pump for equalizing said pressure when the pump has stopped, a motorman's brake valve adapted to be controlled to set the brakes under differential pressure conditions and a passenger-operated valve adapted to be controlled to set said brakes under equalized pressure conditions, said motorman's valve receiving pressure directly from the source of pressure and said passenger-controlled valve receiving pressure indirectly therefrom by way of said automatic means.

16. In a vehicle control system, a pump, means for operating said pump proportionally to the vehicle speed, outlet and inlet lines for the pump, said pump providing differential line pressure when moving and equalized line pressure when stationary, means carrying a positive pressure connected into the outlet of the pump at all times, a manually operable motorman's brake valve drawing upon said positive pressure, a passenger-operated valve drawing upon said pressure only when the inlet pressure is equalized therewith and means connecting the passenger-operated valve and the motorman-operated valve whereby the latter can be caused to be opened to apply brakes by action of the former, independently of the motorman under said equalized pressure conditions.

17. In a vehicle control system, a pump, means for operating said pump proportionally to the vehicle speed outlet and inlet lines for the pump, said pump providing differential line pressure when moving and equalized line pressure when stationary, means carrying a positive pressure connected into the outlet of the pump at all times, a manually operable motorman's brake valve drawing upon said positive pressure, a passenger-operated valve drawing upon said pressure only when the inlet pressure is equalized therewith and means connecting the passenger-operated valve and the motorman-operated valve whereby the latter is caused to be opened to apply brakes by action of the former independently of the motorman under said equalized pressure conditions, a dead-man control associated with said connecting means between the passenger-operated valve and the motorman-operated valve, a vehicle power circuit and means, effective during emergency and when the vehicle stops, for opening the vehicle power circuit by said dead-man's control.

18. In a vehicle control system, a pump movable proportionally to the vehicle speed, outlet and inlet lines therefor, said pump maintaining differential pressure in the outlet and inlet lines thereof when the pump is in motion and an extension from the source of pressure, automatic means blocking pressure passage to said extension under differential pressure conditions and permitting passage of pressure thereto under equalized pressure conditions, means associated with said pump for equalizing said pressure when the pump has stopped, a motorman's brake valve adapted to be controlled to set the brakes under all conditions and a passenger-operated valve adapted to be controlled to set said brakes under equalized pressure conditions, said motorman's valve receiving pressure directly from said pressure source, said passenger-controlled valve receiving pressure indirectly therefrom by way of said automatic means and means for rendering the motorman's valve operative by the passenger under said equalized pressure conditions.

19. In a vehicle control system, a pump, means for operating said pump when the vehicle moves, outlet and inlet lines for the pump, said pump providing differential line pressure when operated and equalized line pressure when stationary, means carrying a positive pressure connected into the outlet of the pump at all times, a manually operable motorman's brake valve drawing upon said positive pressure, a passenger-operated valve drawing upon said pressure only when the inlet pressure is equalized therewith, and means connecting the passenger-operated valve and the motorman-operated valve whereby the latter is caused to be opened to apply brakes by action of the former independently of the motorman under said equalized pressure conditions, a dead-man control associated with said connecting means between the passenger-operated valve and the motorman-operated valve, a vehicle power circuit, means effective during emergency and when the vehicle stops for opening the vehicle power circuit by said dead-man's control, said last-named means functioning also to set the brakes.

20. In a vehicle, running gear, a pump associated with the running gear adapted to run proportionally therewith, said pump maintaining a differential pressure when running, means for equalizing the pressure when the pump is stationary, controlled means adapted to be operated by fluid from the pump, valve means controlling flow to said controlled means and an automatic valve controlling flow to said valve means, whereby the latter may be operated under differential pressure conditions but not under equalized pressure conditions and means for manually operating said valve means.

21. In a control system for vehicles, braking means, means permitting a motorman's control of the brakes when the vehicle is in motion, a dead-man circuit adapted to apply the brakes when said motorman is incapacitated, and passenger-operated means for controlling said brakes when the vehicle is at a standstill, said passenger control effecting operation through said dead-man circuit even though the motorman be on duty.

22. In a control system for vehicles, braking means, means permitting a motorman's control of the brakes when the vehicle is in motion, a dead-man circuit adapted to apply the brakes when said motorman is incapacitated, passenger-operated means for controlling said brakes when the vehicle is at a standstill, said passenger control effecting operation through said dead-man circuit even though the motorman be on duty and means permitting reversal of the vehicle which carries the system without destroying the function of any of said means.

23. A brake pedal valve comprising a body, a poppet valve therein, a main port leading to said valve, a solid piston movable with said valve and a perforated piston movable therewith, means for manually moving said pistons and valve, a port below said solid piston, a port above the solid piston and a port adapted to be covered and uncovered by the solid piston, pressure flowing between said main port and the port below the solid system passing through said perforated piston and unbalancing the pressure on the solid piston when said solid piston closes its port, and a means for exhausting from said ports above and below said solid piston to the port covered and uncovered thereby.

24. A brake pedal valve comprising a body, a main port, a passage therefrom in the body, a perforated piston for opening and closing said passage and a solid piston movable therewith, means for manually moving said pistons, a port below said solid piston, a port above the solid piston and a port adapted to be covered and uncovered by the solid piston, pressure flowing between said main port and the port below the solid system passing through said perforated piston and unbalancing the pressure on the solid piston when said solid piston closes its port and a means for exhausting from said ports above and below said solid piston to the port covered and uncovered thereby.

25. A three-way door valve comprising a body, a supply port in connection therewith, an exhaust port in connection therewith, a delivery port in connection therewith, a valve adapted to open and close the supply port, a perforated piston movable with said valve, said perforations balancing pressure on said piston, the piston covering and uncovering said exhaust port being adapted to cover the same when the supply port is in communication with the delivery port and to uncover the same when the supply port is out of communication as described, whereby the delivery port is put into communication with said exhaust port.

26. In combination a door adapted to be moved in one direction by a spring and in another direction by an engine, said engine comprising a rod, a chamber into which said rod passes, a bellows fastened to said rod and forming a wall of said chamber, a second chamber separated from said first chamber by a partition having a restricted opening, means for delivering fluid to the first-named chamber from a pressure source and unchecked means for exhausting fluid from said second chamber.

27. In a control circuit for vehicles, means for operating brakes controlled by a motorman, said last-named means including a valve, a passenger-operated valve adapted to operate brakes when the car is stationary, said brake operation by the motorman's and passenger-operated valves affecting the same or different brakes but different brake cylinders therefor.

28. In a control system for vehicles, a pump operable proportionally to vehicle speed to provide pressure, a pressure tank, a connection between the pump and the pressure tank, a check valve on pressure side of the pump, an automatic valve, a line leading from the pump side of the check valve to said automatic valve adapted to close the automatic valve when there is pump pressure, a line leading from the outlet side of the automatic valve adapted to be opened and closed by said automatic valve, said line leading to means for operating the vehicle brakes, a passenger-operated valve in said line, a branch connected ahead of said automatic valve leading to another set of brakes, a motorman's control valve in said last-named line, said motorman's valve and said passenger-operated valve controlling separate brake operating means.

29. In a control system for vehicles, a pump operable proportionally to vehicle speed to provide pressure, a pressure tank, a connection between the pump and the pressure tank including a check valve, an automatic valve, a line leading from the inlet side of the check valve to said automatic valve adapted to close the same when there is pump pressure, a line leading from the outlet side of the check valve adapted to be opened and closed by said automatic valve, said line leading to means for operating the vehicle brakes, a passenger-operated valve in said line, a branch connected ahead of said automatic valve leading to another set of brakes, a motorman's control valve in said last-named line, said motorman's valve and said passenger-operated valve controlling separate brake operating means, said passenger-operated valve being effective only when the vehicle has come to a stop and said motorman's valve being effective when the vehicle has stopped or is in motion.

30. In a control system for vehicles, a pump operable proportionally to vehicle speed to provide pressure, a pressure tank, a connection between the pump and the pressure tank including a check valve, an automatic valve, a line leading from the inlet side of the check valve to said automatic valve adapted to close the same when there is pump pressure, a line leading from the outlet side of the check valve adapted to be opened and closed by said automatic valve, said line leading to means for operating the vehicle brakes, a passenger-operated valve in said line, a branch connected ahead of said automatic valve leading to another set of brakes, a motorman's control valve in said last-named line, said motorman's valve and said passenger-operated valve controlling separate brake operating means, a door adapted to be operated by the passenger-operated valve, a second motorman-operated valve and a door adapted to be separately controlled from said last-named valve.

31. In a vehicle control system, running gear, a pump connected to run proportionally to the speed of said running gear, said pump providing a differential pressure when operating and equalized pressure when not operating, a diaphragm valve connected across the suction and pressure sides of said pump, a pressure tank supplied by the pump, a line from the pressure tank, a passenger-operated valve in said line, a sump tank, a line leading thereto from said passenger-operated valve and means for opening and closing said sump line by said diaphragm valve.

In testimony whereof, I have signed my name to this specification this 10th day of October, 1929.

HARVEY S. PARDEE.